United States Patent
Chang

(10) Patent No.: US 7,620,414 B2
(45) Date of Patent: Nov. 17, 2009

(54) WIND-UP POWER CONTROL METHOD AND APPARATUS IN MOBILE COMMUNICATIONS SYSTEM

(75) Inventor: Seok-Il Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 679 days.

(21) Appl. No.: 11/333,310

(22) Filed: Jan. 18, 2006

(65) Prior Publication Data
US 2006/0160557 A1    Jul. 20, 2006

(30) Foreign Application Priority Data
Jan. 19, 2005    (KR) ................ 10-2005-0005156

(51) Int. Cl.
*H04Q 7/20* (2006.01)
(52) U.S. Cl. ............ 455/522; 455/69; 455/127.1; 455/500; 455/67.11; 370/310; 370/320; 370/318
(58) Field of Classification Search .......... 455/522, 455/501, 500, 517, 69, 68, 67.11, 424, 423, 455/425, 67.13, 127.1; 370/310, 320, 318
See application file for complete search history.

(56) References Cited

U.S. PATENT DOCUMENTS

| | | | |
|---|---|---|---|
| 6,622,024 B2 * | 9/2003 | Koo et al. | 455/522 |
| 7,010,321 B2 * | 3/2006 | Chi et al. | 455/522 |
| 7,187,942 B2 | 3/2007 | Hosokawa | |

FOREIGN PATENT DOCUMENTS

| | | |
|---|---|---|
| JP | 2004-200824 A | 7/2004 |
| KR | 2002-0012620 A | 2/2002 |
| WO | WO-2004/025973 A1 | 3/2004 |

* cited by examiner

*Primary Examiner*—Keith T Ferguson
(74) *Attorney, Agent, or Firm*—Birch, Stewart, Kolasch & Birch, LLP

(57) ABSTRACT

A power control method in a mobile communication system, which includes changing an original step size for adjusting a target quality of service (QoS) of a downlink channel to a larger step size when a wind-up power control process is released, and adjusting the target QoS using the changed step size when the wind-up is released.

20 Claims, 4 Drawing Sheets

WIND-UP POWER CONTROL METHOD AND APPARATUS IN MOBILE COMMUNICATIONS SYSTEM

This application claims priority to Korean Application No. 10-2005-0105156, filed in Korea on Jan. 19, 2005, the entire contents of which is incorporated by reference in its entirety.

BACKGROUND OF THE INVENTION

1. Field of the Invention

The present invention relates to a closed loop power control method in a mobile communication system, and more particularly to a wind-up power control method and apparatus in a mobile communication system.

2. Description of the Related Art

In general, in a wideband code division multiple access (WCDMA) mobile communication system, when a mobile terminal passes through a tunnel, etc., an error occurs in a channel due to a sudden decrease in a received power. Therefore, to compensate for the degraded channel, the mobile terminal transmits a command to a corresponding base station requesting the base state sharply increase its transmission power. However, even though this improves the possibility the terminal will receive the channel information without error, the increase in base station power negatively affects other mobile terminals.

To solve this problem, the mobile communication. system uses a wind-up power control algorithm. For example, when a number of times a mobile station has issued a command requesting the base station increase its power is equal to or larger than a particular number, the mobile terminal initiates the wind-up power control algorithm or process.

In the wind-up power control algorithm, a maximum base station transmission power is set a particular level. In more detail; a target power value (target signal to interference ratio (SIR)) of a downlink channel is fixed. Therefore, even if an error occurs in the downlink channel received by the mobile station, the base station does not increase the power intensity beyond the fixed target SIR.

However, the fixed target SIR is more than what is required to provide a general quality of service (QoS) for the mobile terminal operating in a normal environment. Thus, in the wind-up power control algorithm, after the mobile terminal passes through the tunnel, for example, the mobile terminal cancels the higher target SIR and uses an appropriate lower target SIR. Further, when releasing the wind-up power control process, the mobile terminal decreases the higher target SIR using a SIR down step size. That is, the higher SIR value is decreased in smaller steps rather than changing the higher SIR value to the lower SIR value in one single step.

SUMMARY OF THE INVENTION

Accordingly, one object of the present invention is to address the above-noted and other problems.

Another object of the present invention is to provide a wind-up power control method and apparatus in a mobile communication system, which rapidly restores a QoS of a downlink channel to a QoS used before the wind-up process, and thereby improving the power efficiency of the base station and minimizing interferences between mobile terminals.

To achieve these and other advantages and in accordance with the purpose of the present invention, as embodied and broadly described herein, there is provided in one aspect a power control method in a mobile communication system, which includes changing an original step size for adjusting a target quality of service (QoS) of a downlink channel to a larger step size when a wind-up power control process is released, and adjusting the target QoS using the changed step size when the wind-up power control process is released. The present invention also provides a corresponding mobile communication terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
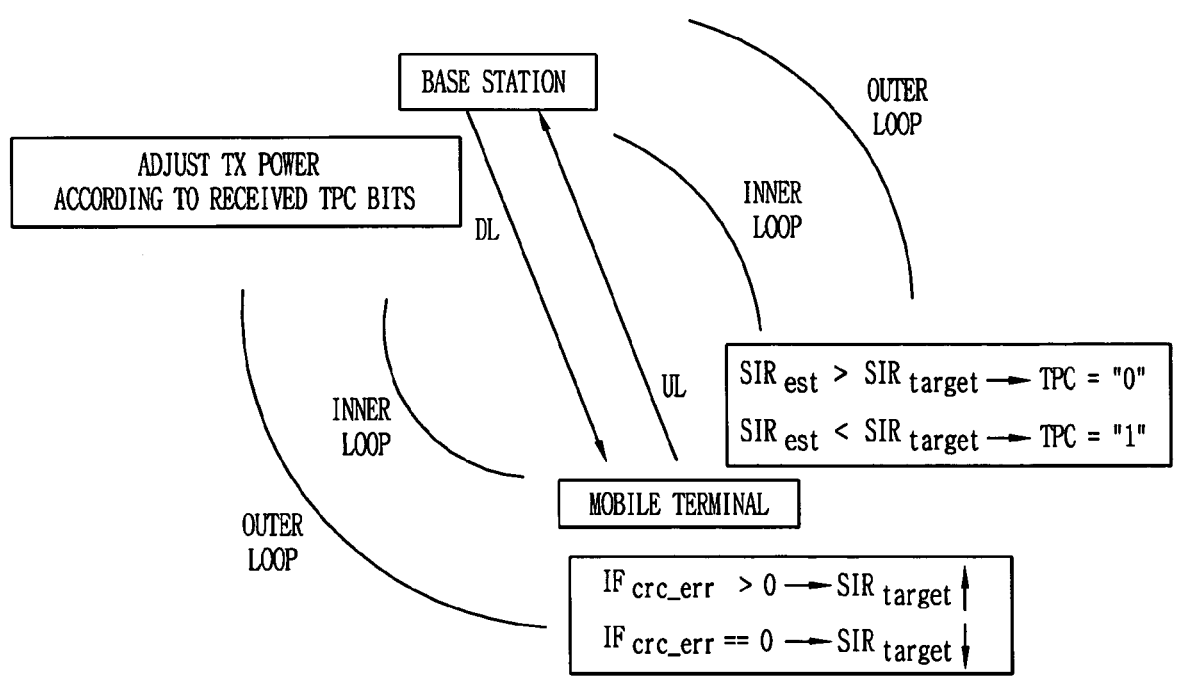
FIG. 1 is an overview illustrating a related art closed loop power control method in a mobile communication system.

First, a detailed explanation of a related art closed loop or wind-up power control method in a mobile communication system will be described with respect to FIG. 1. As shown in FIG. 1, the wind-up power control method includes interactions between an inner loop power control method and an outer loop power control method. In more detail, and as shown in FIG. 1, the outer loop power control method checks a Cyclical Redundancy Check (CRC) error of a downlink channel and determines an appropriate value for a target SIR, and the inner loop power control method controls a transmitting power of the base station by tracking the target SIR of the downlink channel (i.e., the inner loop control method measures a received SIR on the downlink channel and determines if the received SIR is above or below the target SIR value).

That is, the mobile terminal receives a downlink signal (data block) from the base station, and calculates a CRC error value of the received signal. When the calculated CRC error value in the received data block is greater than zero (crc_err >0), the mobile terminal increases the value of the target SIR using a SIR up step size (SIR_Up_Step). Further, when the calculated CRC error value is equal to zero (crc_err=0), the mobile terminal decreases the target SIR using a SIR down step size (SIR_Down_Step). Thus, the mobile terminal determines what value the target SIR should be for the downlink channel based on the outer loop power control method.

In addition, for the inner loop power control method, the mobile terminal estimates a SIR value of the received downlink channel, and compares the estimated SIR value with the target SIR value set in the inner loop power control method. When the estimated SIR is smaller than the target SIR value, the mobile terminal sets a command requesting the base station increase its transmission power for that downlink channel. That is, the mobile terminal transmits power control (TPC) information (e.g., TPC=1) to the base station requesting the base station appropriately increase its transmission power. When the estimated SIR is larger than the target SIR, the mobile terminal transmits TPC information (e.g., TPC='0') requesting the base station appropriately decrease its transmission power.

Further, the following equation is used for the step sizes to determine a value for the target SIR:

If crc_err>0→$SIR_{target}$↑(SIR_Up_Step)(dB)

If crc_err=0→$SIR_{target}$↓
(SIR_Down_Step=SIR_Up_Step*$BLER_{target}$)
(dB)                 Equation (1)

Thus, with reference to Equation (1), for the SIR_Down_Step size, a target block error rate (BLER), which is a rate of a number of received error data blocks to a total number of transmitted data blocks, is calculated for the received downlink signal. The SIR_Up_Step size is set as a fixed value and is not based on the calculated BLER of the downlink signal. Thus, the SIR_Down_Step size is set smaller than the SIR_up_Step size by at least 100 to 1000 times based on the calculated $BLER_{target}$ value.

However, the present inventor advantageously determined the calculated SIR_Down_Step size based on the calculated $BLER_{target}$ value is too small, because it takes too long for the base station to transmit at a normal power for a general QoS for the mobile terminal. That is, in the related art, the power of the base station is not efficiently utilized.

Figure 2:
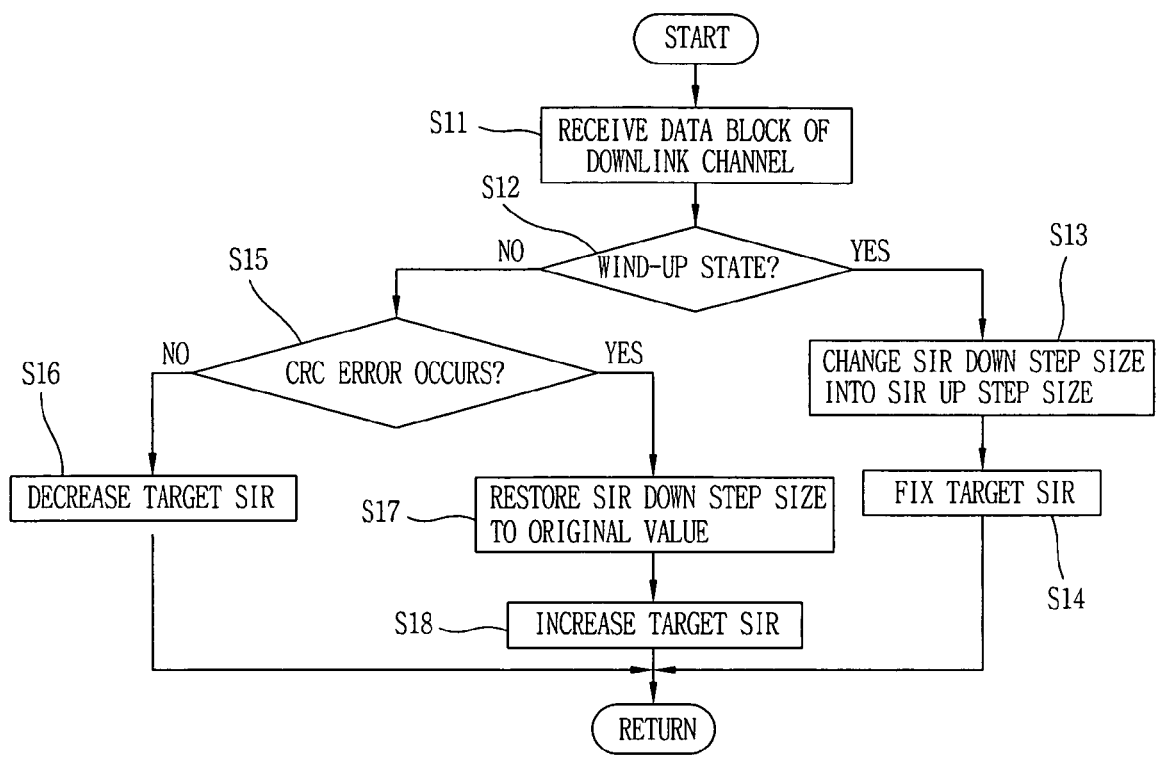
FIG. 2 is a flowchart illustrating a wind-up power control method in a mobile communication system in accordance with an embodiment of the present invention.

Therefore, in accordance with an embodiment of the present invention, the SIR_down_step size is set to have a larger value in the wind-up release state, so the QoS of the downlink channel can be rapidly restored to the QoS before the wind-up control process. In one example, the SIR_Down_Step size is set to be identical to the SIR_Up_Step size. In more detail, FIG. 2 is a flowchart illustrating a wind-up power control method in a mobile communication system in accordance with an embodiment of the present invention. The graph in FIG. 3 illustrating the different step sizes used during the start and release of the wind-up power control method will also be referred to in this description.

As shown in FIG. 2, when a data block is received through a downlink channel (S11), the mobile terminal determines whether a wind-up power control process should be started or has been released (S12). When the wind-up power control process should be started (Yes in S12), the mobile terminal changes the SIR_Down_Step size used to provide a general QoS for the terminal into an SIR_Up_Step size (S13) and selects a fixed target SIR value (S14). The SIR_Up_Steps are shown on the left side of the portion A in FIG. 3 and the fixed target SIR value is shown in the portion A. Therefore, even if a CRC error is calculated in a received data block, the transmission power of the base station does not exceed the fixed target SIR of the downlink channel during the wind-up power control process.

When the wind-up power control process has been released (No in S12), the mobile terminal calculates a CRC value for a received data block and determines if the calculated CRC value is equal to zero (S15). When the CRC error value is zero indicating the data block has been properly received (No in S15), the mobile terminal decreases a target SIR value in accordance with a SIR_Down_Step size that is greater than an original SIR_Down_Step size used to provide a general QoS for the mobile terminal (S16). Note, the original SIR_Down_Step size used to provide a general QoS for the mobile terminal is shown in the portion C of FIG. 3. The wind-up process release SIR_Down_Step size is shown in the portion B of FIG. 3.

Figure 3:
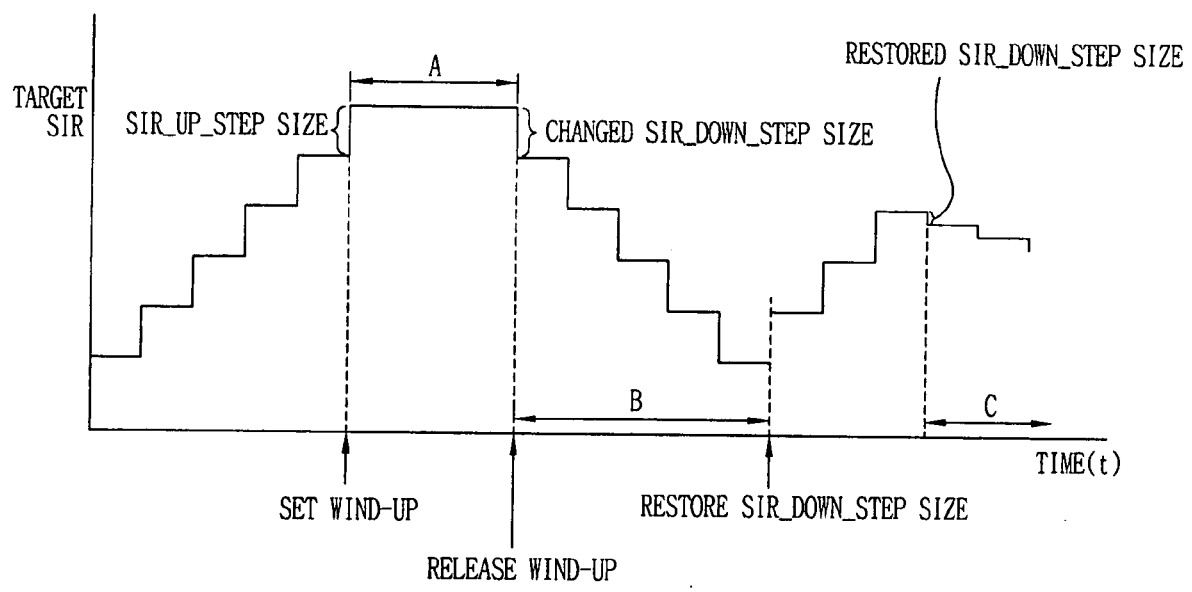
FIG. 3 is a graph illustrating variations of a target SIR of a downlink channel in the wind-up power control method in accordance with an embodiment of the present invention.

Because the wind-up process release SIR_Down_Step size is larger than the original SIR_Down_Step size (as shown in FIG. 3), the target SIR of the downlink channel is rapidly restored to the target SIR before the wind-up power control process was initiated as shown in the section B of FIG. 3. In addition, after the wind-up power control process is released, the mobile terminal continuously decreases the target SIR of the downlink channel using the wind-up process release SIR_Down_Step size until the mobile terminal determines the CRC error value is greater than zero.

In more detail, when the terminal determines the CRC error value is greater than zero (Yes in S15), the mobile terminal resets the SIR_Down_Step size to be the original SIR_Down_Step size (i.e., the SIR_Down_Step size before the wind-up power control process was initiated) (S17). Further, as shown in the section between the portions B and C in FIG. 3, the mobile terminal increases the target SIR of the downlink channel using the SIR_Up_Step size (S18).

Figure 4:
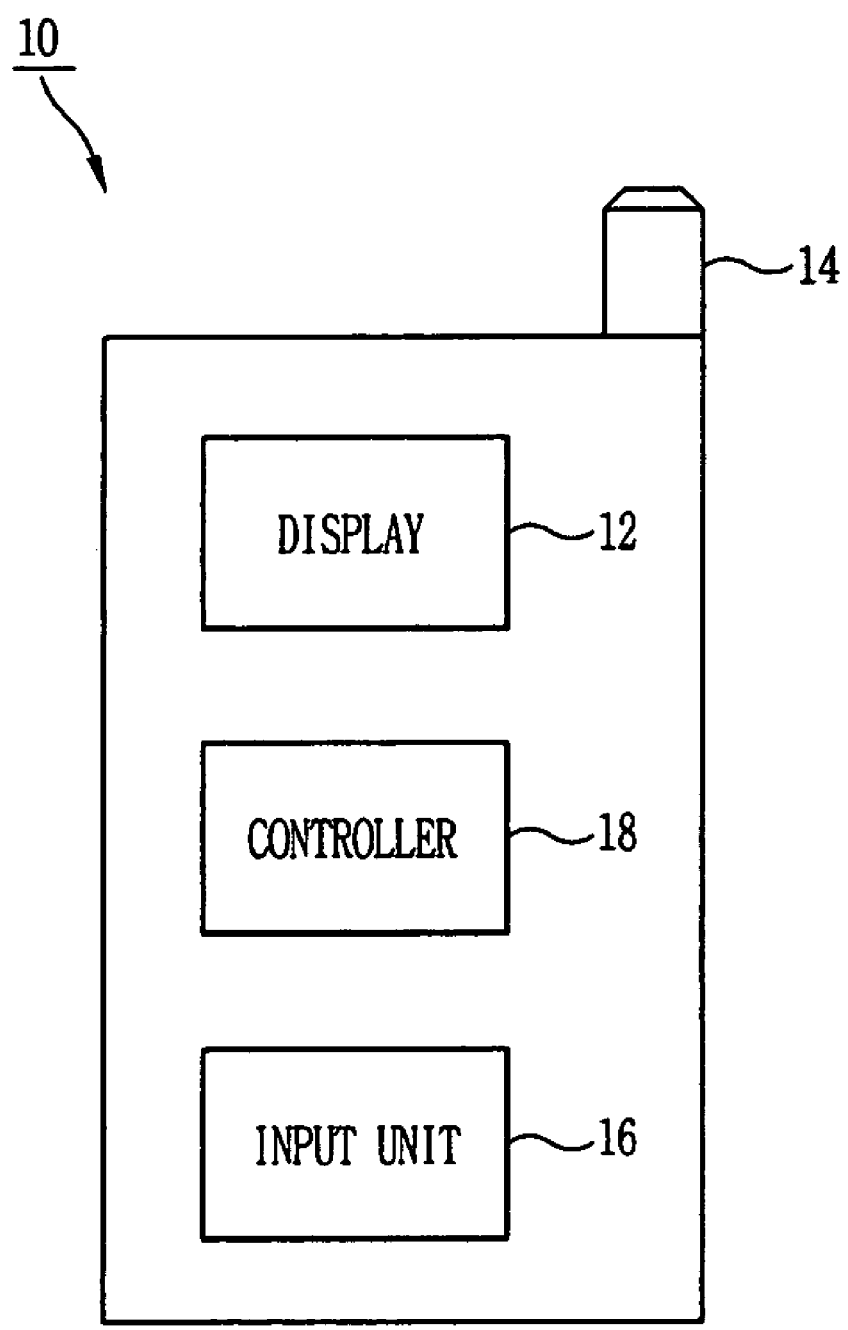
FIG. 4 is an overview of a mobile communication terminal in accordance with an embodiment of the present invention.

Turning next to FIG. 4, which illustrates a mobile terminal 10 in accordance with an embodiment of the present invention. As shown, the mobile terminal 10 includes and antenna 14 for transmitting and receiving data through an uplink and downlink channel, and a controller 18 for controlling the operations of the mobile terminal 10. The mobile terminal also includes a display 12 for displaying information to the user and an input unit 16 allowing the user to input data. The controller 18 also performs the wind-up control method of the present invention.

Thus, with reference to FIG. 4, the controller 18 adjusts the target QoS using the larger SIR_Down_Step size after the wind-up process has been released until a CRC error is calculated. When the CRC error is calculated (via the controller 18), the controller 18 restores the larger SIR_Down_Step size to the original value. After the step size is restored, if the error does not occur again in the downlink channel, the processor continues decreasing the target QoS using the original SIR_Down_Step_size.

Further, the controller 18 also estimates the SIR of the downlink channel, and compares the estimated $SIR_{est}$ with the target $SIR_{target}$. When the estimated $SIR_{est}$ is smaller than the target $SIR_{target}$, the controller 18 transmits TPC information (TPC='1') to the base station through an uplink channel via the antenna 14. In addition, the controller 18 counts the number of the times the TPC information (TPC='1') has been transmitted to the base station. When the number of the times suddenly exceeds a set number in a particular time, the controller 10 determines the wind-up control method should be started. Likewise, the controller 18 may determine the wind-up power control method has been released when the number of times the TPC information (TPC='1') has been transmitted is smaller than the set number for the particular time.

As discussed above, in accordance with an embodiment of the present invention, the wind-up power control method and apparatus rapidly restores the QoS of the downlink channel to the QoS before the wind-up power control method was initiated, thereby improving the power efficiency of the base station and minimizing interferences between the mobile terminals. That is, the mobile terminal changes the original SIR_Down_Step size into a larger value after the wind-up state has been release, and decreases the target SIR of the downlink channel by the changed SIR_Down_Step size in the wind-up release state.

In addition, the wind-up power control method in accordance with another embodiment of the present invention can also control the QoS of the downlink channel based on the particular radio link environment by variably controlling the wind-up power control release down step size of the target SIR. For example, if the controller 18 determines the radio link environment is below a predetermined value (e.g., a poor radio environment), the controller 18 may variably control the wind-up power control release down step size to be smaller than when the radio link environment is determined to be above the predetermined value (e.g., a good radio environment).

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructio As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A power control method in a mobile communication system, the method comprising:
changing a down step size for adjusting a target quality of service (QoS) of a downlink channel to a larger step size from an original step size when a wind-up power control process is initiated; and
adjusting the target QoS using the changed down step size when the wind-up power control process is released.

2. The method of claim 1, wherein the target QoS of the downlink channel is fixed when the wind-up power control process is initiated.

3. The method of claim 2, wherein the target QoS indicates a target signal to interference ratio (sir) of the downlink channel.

4. The method of claim 1, wherein adjusting the target QoS decreases the target QoS.

5. The method of claim 1, wherein the step size indicates a down step size.

6. The method of claim 1, wherein adjusting the target QoS is performed while an error does not occur in the downlink channel after the wind-up power control process is released.

7. The method of claim 6, further comprising:
restoring the changed down step size to the original step size when an error occurs in the downlink channel.

8. The method of claim 7, further comprising:
transmitting power control (tpc) information from a mobile terminal to a base station requesting the base station increase its transmit power for the downlink channel until the target QoS is reached, after restoring the changed down step size to the original step size; and
decreasing the target QoS using the restored step size when a measured target QoS is greater than the target QoS.

9. The method of claim 8, further comprising:
initiating the wind up power control process when a number of times the tpc information has been transmitted from the mobile terminal to the base station is equal to or larger than a set number for a particular time period.

10. The method of claim 9, wherein the changed down step size is identical to an up step size used to request the base station increase its transmission power for the downlink channel.

11. A mobile terminal, comprising:
an antenna configured to transmit and receive data to and from a base station controlling the mobile terminal; and
a controller configured to change a down step size for adjusting a target quality of service (QoS) of a downlink channel from the base station to the mobile terminal to a larger step size from an original step size when a wind-up power control process is initiated,
wherein the controller adjusts the target QoS using the changed down step size when the wind-up power control process is released.

12. The mobile terminal of claim 11, wherein the target QoS of the downlink channel is fixed when the wind-up power control process is initiated.

13. The mobile terminal of claim 12, wherein the target QoS indicates a target signal to interference ratio (sir) of the downlink channel.

14. The mobile terminal of claim 11, wherein by adjusting the target QoS, the controller decreases the target QoS.

15. The mobile terminal of claim 11, wherein the step size indicates a down step size.

16. The mobile terminal of claim 11, wherein the controller adjusts the target QoS while an error does not occur in the downlink channel after the wind-up power control process is released.

17. The mobile terminal of claim 16, wherein the controller restores the changed down step size to the original step size when an error occurs in the downlink channel.

18. The mobile terminal of claim 17, wherein the controller transmits power control (tpc) information to the base station via the antenna requesting the base station increase its transmit power for the downlink channel until the target QoS is reached after restoring the changed down step size to the original step size, and decreases the target QoS using the restored step size when a measured target QoS is greater than the target QoS.

19. The mobile terminal of claim 18, wherein the controller initiates the wind up power control process when a number of times the tpc information has been transmitted from the mobile terminal to the base station is equal to or larger than a set number for a particular time period.

20. The mobile terminal of claim 19, wherein the changed down step size is identical to an up step size used to request the base station increase its transmission power for the downlink channel.

* * * * *